United States Patent
Honda et al.

(10) Patent No.: US 7,228,544 B2
(45) Date of Patent: Jun. 5, 2007

(54) JOB PROCESSING METHOD, JOB PROCESSING UNIT, AND STORAGE MANAGING SYSTEM

(75) Inventors: Masanori Honda, Sagamihara (JP); Takaki Kuroda, Machida (JP); Masaaki Oya, Yokohama (JP); Masao Menjo, Oiso (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 10/371,409

(22) Filed: Feb. 20, 2003

(65) Prior Publication Data

US 2003/0200109 A1    Oct. 23, 2003

(30) Foreign Application Priority Data

Apr. 17, 2002   (JP)   ............... 2002-114909

(51) Int. Cl.
*G06F 13/10*   (2006.01)
*G06F 9/46*    (2006.01)

(52) U.S. Cl. ..................... 718/101; 711/154
(58) Field of Classification Search .............. None
See application file for complete search history.

(56) References Cited

U.S. PATENT DOCUMENTS

| | | | |
|---|---|---|---|
| 5,901,314 A | 5/1999 | Boehme et al. | |
| 6,170,010 B1 | 1/2001 | Hirata et al. | |
| 6,188,401 B1 | 2/2001 | Peyer | |
| 6,233,609 B1 | 5/2001 | Mittal | |
| 6,260,062 B1 | 7/2001 | Davis et al. | |
| 6,529,504 B1* | 3/2003 | Sbisa | 370/385 |
| 6,584,499 B1 | 6/2003 | Jantz et al. | |
| 6,658,464 B2 | 12/2003 | Reisman | |
| 6,714,539 B1* | 3/2004 | Sbisa | 370/385 |
| 6,715,108 B1 | 3/2004 | Badger et al. | |
| 6,715,147 B1 | 3/2004 | Barker | |
| 6,985,983 B2* | 1/2006 | Pellegrino et al. | 710/200 |
| 2002/0004828 A1 | 1/2002 | Davis et al. | |
| 2002/0129094 A1 | 9/2002 | Reisman | |
| 2002/0133699 A1 | 9/2002 | Pueschel | |

(Continued)

FOREIGN PATENT DOCUMENTS

JP   02-054373 A   2/1990

(Continued)

OTHER PUBLICATIONS

Duffield, DM et al. Graphical Operations, May 1, 1995. IBM TDB vol. 38 No. 5, May 1995. pp. 591-594.*

(Continued)

*Primary Examiner*—Gary Portka
(74) *Attorney, Agent, or Firm*—Townsend and Townsend and Crew LLP

(57) ABSTRACT

In the prior art, a user bore a heavy burden on operating together different products having the same functions. A user 102 calls a job net managing function 105 via GUI/CLI 103, and defines a job net 106. A job net execution controlling function 109 interrupts a definition of the job net 106, and sequentially executes the defined jobs. The defined jobs call not real commands directly, but switchers 110 to 114 that define regularized interfaces. The switchers, referring to environment variables 101, select adaptors 115 and 116 properly to call real commands 117 and 118 corresponding thereto.

10 Claims, 6 Drawing Sheets

U.S. PATENT DOCUMENTS

| | | |
|---|---|---|
| 2003/0045947 A1 | 3/2003 | Wampler |
| 2003/0105887 A1 | 6/2003 | Cox et al. |
| 2003/0149847 A1 | 8/2003 | Shyam et al. |
| 2004/0015366 A1 | 1/2004 | Wiseman et al. |
| 2004/0055005 A1 | 3/2004 | Creswell et al. |

FOREIGN PATENT DOCUMENTS

| | | |
|---|---|---|
| JP | 03-9436 A | 1/1991 |
| JP | 2000-148517 A | 5/2000 |
| JP | 2001-229033 A | 8/2001 |
| JP | 2001-282551 | 10/2001 |
| JP | 2002-032258 | 1/2002 |

OTHER PUBLICATIONS

Robbins, Judd. Mastering DOS, 1988. SYBEX, Inc., ISBN: 0895885557. pp. 462-465.*

Gookin, Dan. More DOS for Dummies, 1994. IDG Books Worldwide, Inc., ISBN: 1568840462. pp. 135, 166 & 167.*

Japan Patent Office (JPO) Decision of refusal dated Mar. 7, 2007 for JPO patent application JP2002-114909.

* cited by examiner

FIG.2

| functions | sub functions | regularized interfaces | products | real commands |
|---|---|---|---|---|
| RAID managing function | pair split | SplitPair vol_name | RAID management A | $RAID_A/pairsplit vol_name |
| | | | RAID management B | $RAID_B/split pair_name |
| | pair resynchronization | ResyncPair vol_name | RAID management A | $RAID_A/pairresync vol_name |
| | | | RAID management B | $RAID_A/split pair_name |
| file system function | mount | Mount dev_name mount_point | file system A | $RAID_A/pairsplit vol_name |
| | | | file system B | $RAID_B/split pair_name |
| | unmount | Unmount mount_point | file system A | $RAID_A/pairresync vol_name |
| | | | file system B | $RAID_A/split pair_name |
| database managing function | backup mode | BackupMode instance_name | database management A | $DB_A/OnBackupMode instance_name |
| | normal mode | NormalMode instance_name | database management A | $DB_A/NormalMode instance_name |
| | online | OnlineDb instance_name | database management A | $DB_A/OnlineDb instance_name |
| | offline | OfflineDb instance_name | database management A | $DB_A/OfflineDb instance_name |
| backup function | backup | Backup config_name | backup A | $BU_A/a_back -f config_name |
| | | | backup B | $BU_B/backup -classclass_name |
| | | | backup C | $BU_C/cbackup -defdefine_name |
| | restore | Restore config_name | backup A | $BU_A/a_res -f config_name |
| | | | backup B | $BU_B/restore -classclass_name |
| | | | backup C | $BU_C/crestore -defdefine_name |
| volume managing function | volume expansion | Expand size dev_name | volume management A | $VM_A/vmaextendsize dev_name |
| | | | volume management B | $VM_B/expand size dev_name |
| | volume reduction | Reduce size dev_name | volume management A | $RAID_A/pairresync vol_name |
| | | | volume management B | $RAID_A/split pair_name |

FIG.3
(a)
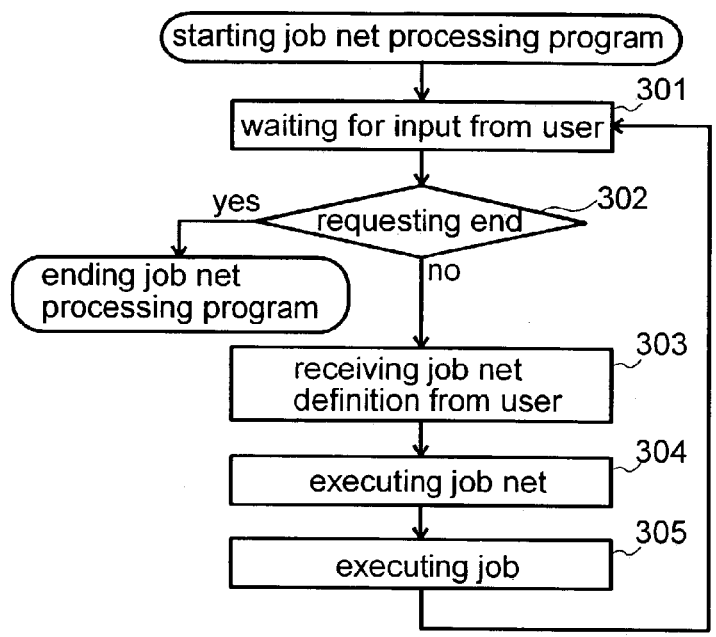
(b)
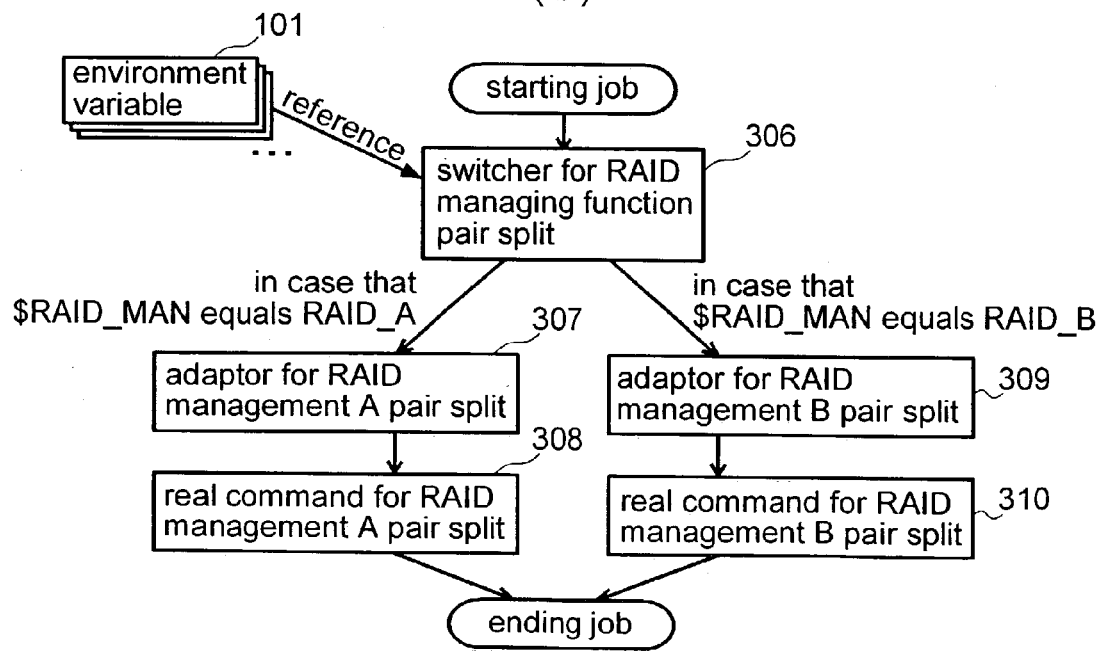

FIG.4 switcher for RAID managing function pair split

```
#!/usr/bin/sh
if [ " $1 " != " " ] ; then
    VOL_NAME=$1
fi
$JN_EXE / $RAID_MAN / SplitPair $VOL_NAME
```
110 adaptor for RAID management A pair split
($JN_EXE / RAID_A / SplitPair)

```
#!/usr/bin/sh
if [ " $1 " = " " ] ; then
    exit 1
fi
VOL_NAME=$1
$RAID_A / pairsplit $VOL_NAME
```
115 adaptor for RAID management B pair split
($JN_EXE / RAID_B / SplitPair)

```
#!/usr/bin/sh
if [ " $1 " = " " ] ; then
    exit 1
fi
PAIR_NAME=$1
$RAID_B / split $PAIR_NAME
```
116

FIG.5

| templates | functions | sub functions |
|---|---|---|
| online backup for specified database when specified time is reached (mirroring configuration) | calendar function | execution time setting |
| | database managing function | backup mode |
| | RAID managing function | pair split |
| | database managing function | normal mode |
| | file system function | mount |
| | backup function | backup |
| | file system function | unmount |
| | RAID managing function | pair resynchronization |
| capacity expansion for specified volume when specified event is received | event processing function | event monitoring |
| | volume managing function | capacity expansion |

400
JOB PROCESSING METHOD, JOB PROCESSING UNIT, AND STORAGE MANAGING SYSTEM

BACKGROUND OF THE INVENTION

The present invention relates to a job processing method, a job processing unit, and a storage managing system, particularly to those for processing a plurality of jobs defined as a job net.

The prior art disclosed in JP-A No. 32258/2002 and JP-A No. 282551/2001 provides methods for automatically executing a plurality of jobs defined as job net. In job processing methods using this prior art, a "job" may be one command or a script in which a procedure for executing a plurality of commands or programs is stated. For example, to execute a backup command BU of a backup tool A, the command BU and its parameter are specified for a job definition.

Generally, various products having similar functions have been brought to the market. For example, backup tools sold by different vendors provide some unique functions, but mainly function in the same way as one another (backup and restore of data). The same goes for database management tools, large storage management tools, virtual volume management tools, and ability management tools.

Commands or scripts for these tools are usually specified for jobs in a job net. Job definitions need to be changed depending on a product to be used. For example, a backup command of a backup tool A is assumed to be BUa. The BUa is defined as a job. When a backup tool B is used, the job definition needs to be changed to a backup command BUb of the backup tool B. This means that, although the commands BUa and BUb have the same function, the job definition needs to be changed. This is because different products have different command names and different option specifying methods. Commands and scripts, such as the backup commands BUa and BUb, of tools providing functions required by a user are hereinafter called real commands.

In a small system, management using the aforementioned jobs in the job net does not cause serious problems when the job definitions are changed. When the tool B is used instead of the tool A because of integration of large systems, all the job definitions need to be changed from the command names and options for the tool A to those for the tool B although there are few differences between the contents of the job nets of the tools A and B. As a management tool for large storage, however, challenges are presented because the capacity of storage is expanding quickly, and personnel managing the storage use some storage management tools which expand daily. In a huge data center, large storage of different manufacturers may be used, and thus different management tools may be required for the different storage. In such a case, the aforementioned prior art require a command name defining a job to be changed depending on a storage to be used. This causes a heavy burden on a system manager.

BRIEF SUMMARY OF THE INVENTION

This invention solves the aforementioned problems, and provides a job processing method, a job processing unit, and a storage managing system that are flexibly adaptable for changing a system and selecting a tool using regularized interfaces of the same functions provided by different products. In addition, the present invention provides job processing method, a job processing unit, and a storage management system. In these embodiments, a real command is selectable when executed by setting outside job definitions (e.g., environment variables) and information for selecting real commands. A user can select a template by providing job net templates defined using a regularized interface.

In a job processing method for executing a plurality of jobs defined as a job net, a regularized interface regularizes a plurality of the same functions whose command names and option specifying methods differ depending on manufacturers or products, and the job calls the regularized interface. The regularized interface switches a called function to a call for a proper real command by referring to variables defined using environment variables of an OS outside a job net. Additionally, one of a plurality of templates using the regularized interfaces for different tasks can be referred to for executing a specific task.

The job processing unit for executing a plurality of jobs defined as a job net comprises means for defining a regularized interface that regularizes a plurality of the same functions whose different command names and option specifying methods differ depending on manufacturers and products, and means for causing the jobs to call the regularized interfaces.

BRIEF DESCRIPTION OF THE DRAWINGS

FIG. 2 illustrates an example of regularized interfaces;

FIG. 3 illustrates flowcharts explaining processing operations in a job net processing program 100, wherein FIG. 3(a) is a flowchart of the overall processing and FIG. 3(b) is a flowchart of the job execution processing;

FIG. 4 is an example of installation of switchers and adaptors;

FIG. 5 shows an example of a configuration of job net templates; and

DETAILED DESCRIPTION OF THE INVENTION

Figure 1:
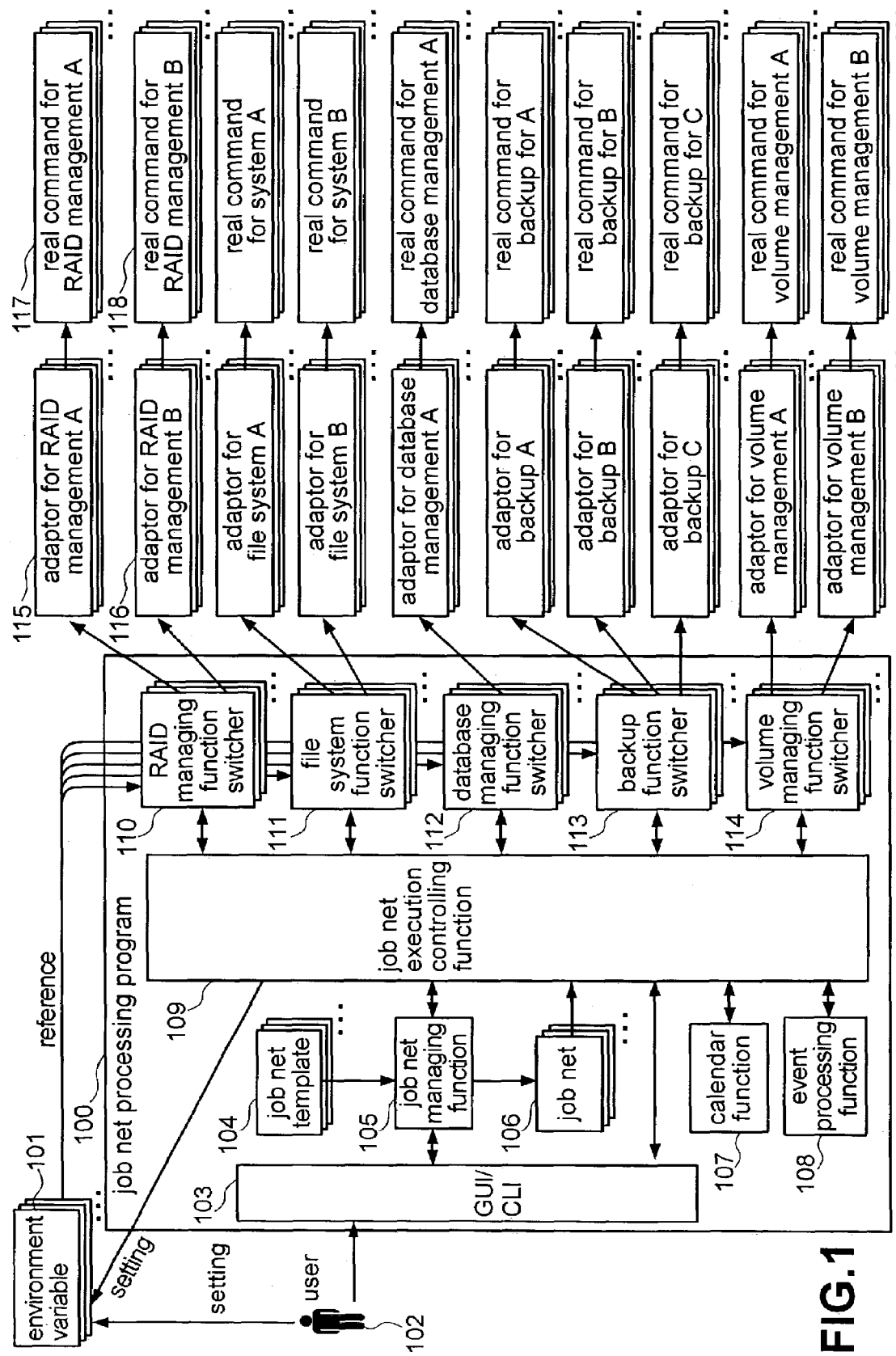
FIG. 1 illustrates a structure of a basic program according to one embodiment for storage management.

FIG. 1 illustrates a basic program structure for a job processing unit according to one embodiment when the present invention is applied for storage management. As shown, in FIG. 1, a job net processing program 100, environment variables 101, a user 102, a Graphical User Interface/Command Line Interface (GUI/CLI) 103, job net templates 104, a job net managing function 105, job nets 106, a calendar function 107, an event processing function 108, a job net execution controlling function 109, RAID managing function switchers 110, file system function switchers 111, database managing switchers 112, backup function switchers 113, volume managing function switchers 114, adaptors 115 for managing RAID A, adaptors 116 for managing RAID B, real commands 117 for RAID management A, and real commands 118 for RAID management B are provided.

One embodiment of the invention shown in FIG. 1 includes a job net processing program 100, and a plurality of adaptors 115 and 116 for products managed by the invention and for their functions, which adaptors call real commands 117 and 118 of the products. The job net processing program 100 comprises a GUI/CLI 103 used as a user interface, a plurality of job net templates 104, a job net managing function 105, a plurality of job nets 106, a calendar function 107, an event processing function 108, a job net execution controlling function 109, a plurality of RAID managing function switchers 110, a plurality of file system function switchers 111, a plurality of database managing function switchers 112, a plurality of backup function switchers 113, and a plurality of volume managing switchers 114, which five types of switchers are provided for functions required for storage management. Environment variables 101 of OS are defined outside the job net processing program 100.

In the above embodiment, the user 102 operates all inputs and outputs for the job net processing program 100 by using the GUI/CLI 103. The user 102 then calls the job net managing function 105 to define the job net 106. At this point, the user 102 can also set simple options by using the job net template 104 to complete the job net 106.

The job net execution function 109 interrupts a definition of the job net 106 and sequentially executes the defined jobs. The job net and each job therein start to be executed in response to a time set in the calendar function 107, an event received by the event processing function 108, or end of a preceding job in the job net.

Each job defined in the job net 106 does not call a real command directly, but a regularized interface. This means that the switchers 110 to 114 shown in FIG. 1, which define the regularized interfaces, are called. One of the switchers 110 to 114 shown in FIG. 1 corresponds to one regularized interface. Each switcher refers to environment variables 101 to properly select adaptors 115 and 116. One adaptor corresponds to one or more real commands 117 and 118.

FIG. 2 is an example of a regularized interface. In this example, functions 201 for storage management are mainly classified into five functions. Each of the five functions is classified into sub functions 202, each of which corresponds to one real command. Regularized interfaces 203 are defined for the sub functions 202, and called by jobs in a job net. Products 204, real commands and their options 205 provided by the products 204 correspond to the regularized interfaces 203.

In FIG. 2, the RAID managing function has two sub functions, "pair split" and "pair resynchronization," for which regularized interfaces "SplitPair" and "ResyncPair" are defined respectively. The regularized interface including italicized characters "vol_name" is an option selectable for a user. In an example shown in FIG. 2, RAID managing products called "RAID management A" and "RAID management B" correspond to the regularized interfaces. For example, the regularized interface "SplitPair" corresponds to a command "pairsplit" of "RAID management A" and to a command "split" of "RAID management B." A string "$RAID_A" or "$RAID_B" in head of each real command is an environment variable showing a path having a command or script of each product.

In an example shown in FIG. 2, a RAID managing function corresponds to two products, a file system function corresponds to two products, a database function corresponds to one product, a backup function corresponds to three products, and a volume managing function corresponds to two products. For storage management, regularized interfaces for "topology function," "volume monitoring function," and "capability monitoring function" may be also defined (not shown). In this case, switchers and adaptors corresponding to these functions are installed in the structure shown in FIG. 1.

FIG. 3 shows two flowcharts to illustrate processing operations in the job net processing program 100. FIG. 3(a) is an overall processing flowchart, and FIG. 3(b) is a job execution processing flowchart. The job net processing program 100 starts to run to be a wait-state for an input by a user, and continues to run until receiving an end request from a user (steps 301, 302). When receiving a request for defining a job net from a user, the job net processing program 100 stores the definition in itself. The user may define all the job nets 106 from the beginning, or define job nets only by setting simple options (step 303).

When a condition for starting execution of the job net is fulfilled (e.g., a specified time is reached, or a specified event is received), the job net processing program 100 executes the job net. Next, each job defined in the job net is also executed when a condition for starting execution of the job (e.g., end of a preceding job in the job net, reception of a specified event) is fulfilled (step 305).

The job execution procedure is as follows. The example of a "pair split" of the RAID managing function called as a job will be explained. After starting a job, the job net processing program 100 first calls "pair split" switcher 110. The switcher 110 refers to $RAID_MAN of the environment variables 101 and judges whether $RAID_MAN is "RAID_A" or "RAID_B" (step 306). When a value of $RAID_MAN is judged to be "RAID_A" in step 306, the switcher 110 calls "pair split" adaptor 115 of a RAID management product "RAID management A."

Next adaptor 115 calls a real command 117 for "pair split" of "RAID management A" (step 308). When $RAID_MAN environment variable 101 is judged to be "RAID_B" in step 306, the switcher 110 calls "pair split" adaptor 116 of a RAID management product "RAID management B." The called adaptor 116 calls a real command 118 for "pair split" of the "RAID management B" (step 310). Such a procedure enables real commands to switch using environment variables when a job is executed.

FIG. 4 is an example of an installation of a switcher and adaptor. The switcher 110 for a RAID management function "pair split," the adaptor 115 for RAID management A "pair split," and the adaptor 116 for RAID management B "pair split" are installed using shell scripts of UNIX. As described in the flowcharts of FIG. 3, an environment variable $RAID_MAN to be referred to is defined in the switcher 110. In the adaptors 115 and 116 called by referring to the environment variables, a real command to be called and its option are stated as "$RAID_A/pairsplit $VOL_NAME" and "$RAID_B/split $PAIR_NAME," and preprocesses for calling these real commands are determined.

As described above, a real command is called via an adaptor. In the invention, a real command can be also called directly by executing a conditional in a switcher, so that an adaptor becomes unnecessary. In this case, however, a switcher needs to be rewritten when a new RAID management C for a newly-installed storage is to be supported. As described in the above embodiment, with a method using adaptors, a directory for the RAID management C is produced, and $RAID_MAN of environment variables 101 is changed to "RAID_C," without changing existent switchers and adaptors. In this case, new adaptors for the RAID management C are required.

In reference to FIG. 5, structure examples of job net templates will be explained in the following. Two templates of FIG. 5 have a content field 501, a function field 502, and a sub function field 503. In the first template example 511, a volume of data of a database stored in a large disk apparatus is assumed to have a mirroring configuration of RAID. This example shows that a procedure for high speed online backup is templated.

Generally, a procedure of the above-described high speed online backup is as follows. First, a database enters backup mode, and a volume for a mirroring configuration splits from the database. After the split, the database enters normal mode. The database can thus restart its normal operation at once. Next, the split snapshot is mounted to execute backup. After the backup, the volume is unmounted, and resynchronized with the database to return to the mirroring configuration.

To operate the above procedure, the template 511 has backup mode 522, pair split 523, normal mode 524, mount 525, backup 526, unmount 527, and pair resynchronization 528, as sub functions. Additionally, to execute the backup periodically, another sub function, execution time setting 521 for specifying a time (e.g., 23:00 every Friday), is provided. The functions 502 for executing the sub functions correspond to the sub functions.

As described above, a complicated procedure is required only for backup according to a backup structure. Procedures of the same backup structures are similar to one another. A user has a considerable burden on defining the procedure from the beginning. A previously-provided template for the general procedure can reduce vastly the burden of the user.

The next template example 512 is such that, by using a capacity monitoring product, a specified event is previously set to be executed when a usage capacity of a specified volume exceeds a specified value. This is a template of procedures for specified-event reception 529 and specified-volume capacity expansion 530. This example is a relatively simple template.

These two templates are defined using the regularized interfaces. Without definitions using the regularized interfaces, Each product providing a different function needs a different template. For example, in the first template 511 of FIG. 5, definitions for one database management product, two RAID management products, two file system products, and three backup products needs 12 (1×2×2×3) different templates. Although these templates execute the substantially same functions having a little different formats of commands and scripts, many operations are required for generating the templates.

FIG. 5 shows only two templates. Actually, a dozen types (or more) of templates are required for storage management. If the templates are further divided into from several to over ten types according to different products providing real commands, a user needs to spend long time on selecting templates. Additionally, a user may select a wrong template. In this embodiment, with a definition using the regularized interfaces, only one template is needed. As a result, a user can generate a template without a heavy burden, select a template quickly, and avoid selecting a wrong template.

Figure 6:
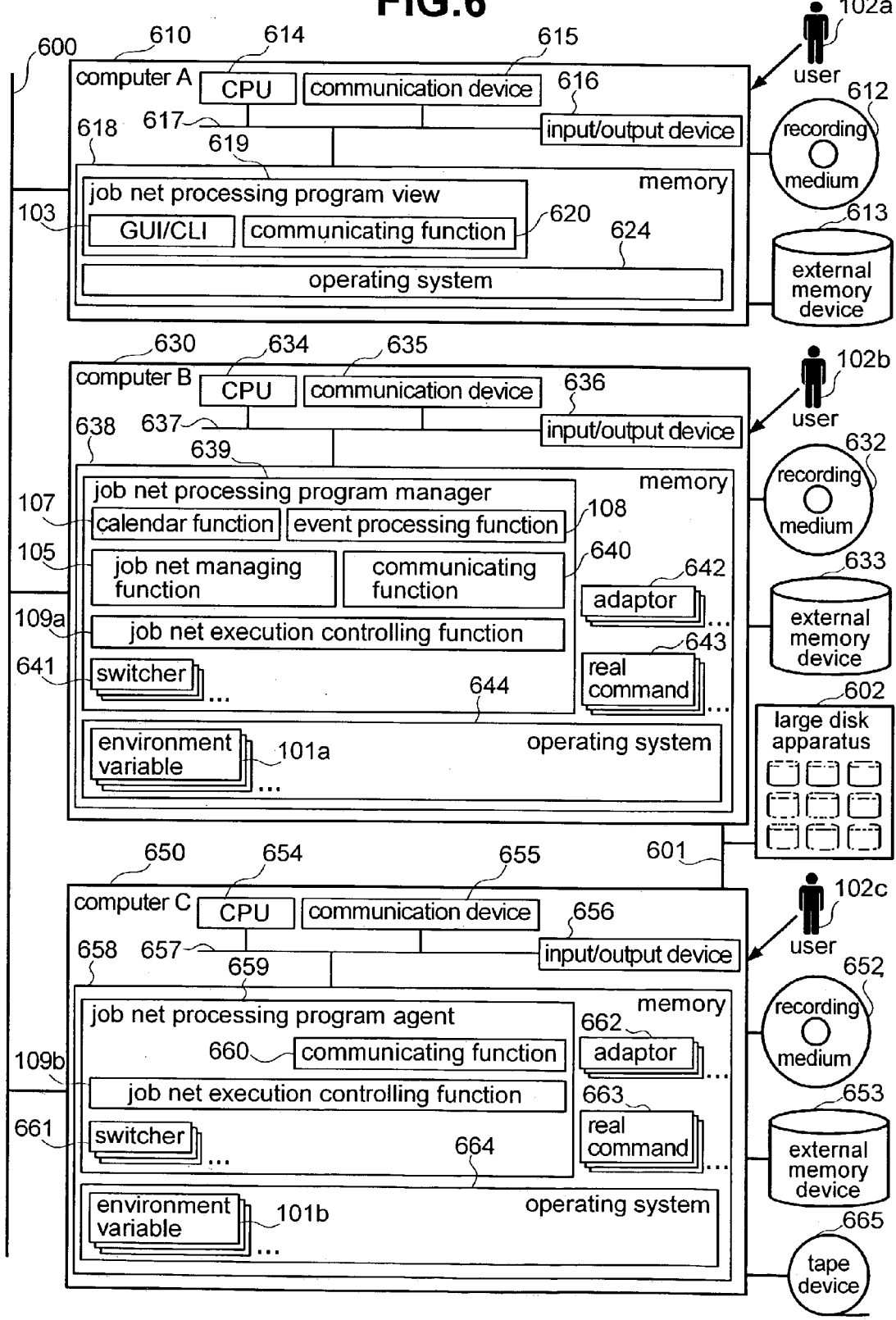
FIG. 6 is a block diagram showing a configuration of a job processing unit according to one embodiment when the invention is applied for storage management.

FIG. 6 is a block diagram showing a structure of a job processing unit according to one embodiment when the invention is applied for storage management. In FIG. 6, networks 600 and 601, a large disk apparatus 602, computers A610, B630, and C650, recording mediums 612, 632, and 652, external storage devices 613, 633, and 653, CPUs 614, 634, and 654, communication devices 615, 635, and 655, input/output devices 616, 636, and 656, buses 617, 637, and 657, memories 618, 638, and 658, a job net processing program view 619, a job net processing program manager 639, a job net processing program agent 659, communication functions 620, 640, and 660, operating systems 624, 644, and 664, switchers 641 and 661, adaptors 642 and 662, real commands 643 and 663, and a tape device 665 are provided. The other reference numerals are the same as ones in FIG. 1.

The job processing unit of FIG. 6 is so constructed that the job net processing program is divided into three components the view 619, the manager 639, and the agent 659, which operate separately on the computers A610, B630, and C650. Flexibility of the unit thus increases. Over the network 600, the computers A610, B630, and C650 are interconnected to one another and to the external.

The computer A610 comprises the CPU 614, the memory 618, the input/output device 616, and the communication device 615. The memory 618 includes the operation system 624, and the job net processing program view 619 having the GUI/CLI 103 and the communicating function 620.

The computer B630 comprises the CPU 634, the memory 638, the input/output device 636, and the communication device 635. The memory 638 includes the operating system 644 having environment variables 101*a*, the calendar function 107, the event processing function 108, the job net managing function 105, the job net execution controlling function 109*a*, the job net processing program manager 639 having the switchers 641 for different products and the communication function 640, adaptors 642 for different products, and the real commands 643 of storage management products.

The computer C650 comprises the CPU 654, the memory 658, the input/output device 656, and the communication device 655. The memory 658 includes the operating system 664 having environment variables 101*b*, the job net execution controlling function 109*b*, the job net processing program agent 659 having the switchers 661 for different products and the communication function 660, adaptors 662 for different products, and the real commands 663 of storage management products.

Although the above-described example shows that storage management products are installed on the computers B630 and C650, the computers do not need the same storage management products. For example, a database managing function and a RAID managing function can be installed on the computer B630, and a file system function and a backup function can be installed on the computer C650. As a result, the load can be distributed. The same products also may be installed on the computers.

An example shown in FIG. 6 is as follows. The large disk apparatus 602 is connected to the computers B630 and C650 via the storage area network 601. The computer C650 also is connected to the tape device 665. A database managing function, a RAID managing function, and a file system function are installed on the computer B630. A backup function and a file system function are installed on the computer C650. In such a structure of an embodiment shown in FIG. 6, online backup of a database becomes possible by using a mirroring function of the large disk apparatus. In this case, the computer B630 runs as a database server, and the computer C650 runs as a backup server. While the database on the computer B630 is running, the computer C650 mounts a split snapshot to back up data of the large disk apparatus 602 onto the tape device 665.

In the above-described structure of the invention shown in FIG. 6, the job processing program agent 659 can operate on a plurality of hosts (computers). As a result, the invention is applicable for a large system structure and a large storage structure.

The three components may operate on different computers, or on the same computer. In the above-described embodiment, because the manager 639 includes functions of the agent 659, these three components need not operate on the same computer. In the invention, the job net execution controlling function 109*a* and the switchers 641 can be deleted from the manager 639 to decrease the usage amount of the memory of the manager. When a job is executed on a computer on which the manager operates, another agent needs to operate on the computer.

In the above embodiment, the job net processing programs 619, 639, and 659 recorded on the recording mediums 612, 632, and 652 can be provided from the external, and are installed on the corresponding computers to construct a job net processing unit. These mediums may be in forms of HDs, DATs, FDs, MOs, DVD-ROMs, and CD-ROMs. The job net processing programs stored on another memory device can be installed via the communication devices 615, 635, and 655 and the network 600 to construct a job net processing program. The job net processing unit stores the job net processing programs 619, 639, and 659 onto the external storage devices 613, 633, and 653, and loads onto its memory and executes the programs according to requirement. Without the external storage devices, the job net processing programs stored on another storage device can be also loaded onto the memory of the unit via the communication devices and the network according to requirement.

In the above embodiment, the invention is applied for storage management. The invention also is applicable for any system that executes a plurality of jobs defined as a job net. According to the invention, different products having the same functions can be operated together, saving operations by a user. Additionally, according to the invention, products can be selected when jobs are executed. As a result, a product for a subsequent job can be selected in a job net, enabling a flexible job net. Further, according to the invention, the number of templates can be decreased. As a result, time spent by a user on selecting the templates can be shortened, and the possibility that a user selects a wrong template can be reduced.

What is claimed is:

1. A job processing method for executing a plurality of jobs defined as a job net in a storage system, the storage system including a plurality of computers that are coupled to one or more disk apparatus via a storage area network, the job processing method comprising:

providing a first regularized command for a plurality of real commands of first type, the real commands of first type including a first real command for performing a first function on a first device that is associated with a first company and a second real command for performing the first function on a second device that is associated with a second company, the first and second devices being of the same device type;

providing a second regularized command for a plurality of real commands of second type, the real commands of second type including a third real command for performing a second function on the first device and a fourth real command for performing the second function on the second device;

providing a plurality of interfaces including first and second interfaces, the first interface operable to handle the first function associated with the first regularized command, the second interface operable to handle the second function associated with the second regularized command;

receiving a regularized command to perform a given function on a component within the storage system;

invoking a suitable interface from the plurality of interfaces, the suitable interface being the first interface if the given function is the first function or the second interface if the given function is the second function;

providing a plurality of functions of a plurality of storage management products. wherein the plurality of functions comprises a RAID managing function, a file system function, a database managing function, a backup function, and volume managing function;

providing a plurality of switchers that refer to environmental variables to properly select a suitable adapter from a plurality of adapters and to select the suitable adapter associated with the invoked suitable interface, wherein the environmental variables are defined outside of the job processing method, and wherein the plurality of switchers are located inside of the job processing method;

selecting the suitable adapter from a plurality of adapters associated with the invoked interface, the suitable adapter being selected according to the regularized command that has been received and by calling the plurality of adaptors located outside of the job processing method; and calling a suitable real command using the selected adapter, wherein the suitable real command corresponds to one of the storage management products, wherein some of the adapters are related to one switcher, and wherein each of the adapters is related to at least one of the storage management products, wherein the suitable real command being the first or third real command if the component on which the given function is to be performed is associated with the first company, or the second or fourth real command if the component on which the given function is to be performed is associated with the second company.

2. The job processing method according to claim 1, wherein the suitable interface is the switcher, the real commands being based on variables defined using environment variables of an operating system outside a job net.

3. A job processing unit for executing a plurality of jobs defined as a job net in a storage system, the storage system including a plurality of computers that are coupled to one or more disk apparatus via a storage area network, the storage system comprising:

a computer readable medium including a table, the table including a first regularized command for a plurality of real commands of first type, the real commands of first type including a first real command for performing a first function on a first device that is associated with a first company and a second real command for performing the first function on a second device that is associated with a second company, the first and second devices being of the same device type, a second regularized command for a plurality of real commands of second type, the real commands of second type including a third real command for performing a second function and a fourth real command for performing the second function on the second device;

a plurality of interfaces including first and second interfaces, the first interface operable to handle the first function associated with the first regularized command, the second interface operable to handle the second function associated with the second regularized command;

a plurality of functions of a plurality of storage management products, wherein the plurality of functions comprises a RAID managing function, a file system function, a database managing function, a backup function, and volume managing function;

a plurality of switchers that refer to environmental variables to properly select a suitable adapter from a plurality of adapters and to select the suitable adapter associated with the invoked suitable interface, wherein the environmental variables are defined outside of a job processing unit, and wherein the plurality of switchers are located inside of the job processing unit a plurality of adapters that call suitable real commands corresponding to one of the storage management products, wherein some of the adapters are related to one switcher, wherein each of the adapters is related to at least one of the storage management products, wherein the plurality of adapters includes a first set of adapters that are associated with the first interface and a second set of adapters that are associated with the second interface, and wherein the plurality of adapters are located outside of the job processing unit;

means for receiving a regularized command to perform a given function on a component within the storage system;

means for invoking a suitable interface from the plurality of interfaces, the suitable interface being the first interface if the given function is the first function or the second interface if the given function is the second function;

means for selecting a suitable adapter from a plurality of adapters according to the given function and the component on which the given function is to be performed; and means for calling a suitable real command based on the suitable adapter that has been selected.

4. The job processing unit according to claim 3 wherein means for defining a regularized interface is provided for each different function.

5. The job processing unit according to claim 3, further comprising a plurality of templates for different tasks, which templates use regularized interfaces and are referred to for specific tasks.

6. The job processing unit according to claim 4, further comprising a plurality of templates for different tasks, which templates use regularized interfaces and are referred to for specific tasks.

7. A storage system configured to store data and execute a plurality of jobs in a storage system, the storage system comprising:

a plurality of computers;

one or more disk apparatus coupled to the computers via a storage area network;

a computer readable medium including a table, the table including a first regularized command for a plurality of real commands of first type, the real commands of first type including a first real command for performing a first function on a first device that is associated with a first company and a second real command for performing the first function on a second device that is associated with a second company, the first and second devices being of the same device type, a second regularized command for a plurality of real commands of second type, the real commands of second type including a third real command for performing a second function on the first device and a fourth real command for performing the second function on the second device;

a plurality of interfaces including first and second interfaces, the first interface operable to handle the first function, the second interface operable to handle the second function;

a plurality of functions of a plurality of storage management products, wherein the plurality of functions comprises a RAID managing function, a file system function, a database managing function, a backup function, and volume managing function;

a plurality of switchers located within the that refer to environmental variables to properly select a suitable adapter from a plurality of adapters and to select the suitable adapter associated with the invoked suitable interface, wherein the environmental variables are defined outside of a job processing unit, and wherein the plurality of switchers are located inside of the job processing unit;

a plurality of adapters that call suitable real commands corresponding to one of the storage management products, wherein some of the adapters are related to one switcher, wherein each of the adapters is related to at least one of the storage management products, wherein the plurality of adapters includes a first set of adapters that are associated with the first interface and a second set of adapters that are associated with the second interface, and wherein the plurality of adapters are located outside of the job processing unit;

means for receiving a regularized command to perform a given function on a component within the storage system;

means for invoking a suitable interface from the plurality of interfaces, the suitable interface being the first interface if the given function corresponds to the first function or the second interface if the given function corresponds to the second function;

means for selecting a suitable adapter from a plurality of adapters according to the invoked interface and the component on which the given function is to be performed; and means for calling a suitable real command based on the suitable adapter that has been selected.

8. The job processing method according to claim 1, further comprising providing a directory associated with the called suitable real command, wherein the called suitable read command is for RAID management.

9. The storage system according to claim 3, further comprising a directory associated with the called suitable real command, wherein the called suitable read command is for RAID management.

10. The storage system according to claim 7, further comprising a directory associated with the called suitable real command, wherein the called suitable read command is for RAID management.

* * * * *